United States Patent [19]
Murphy

[11] Patent Number: 5,051,323
[45] Date of Patent: Sep. 24, 1991

[54] ROLLBACK INNER COVER

[75] Inventor: Katherine A. Murphy, Medina, Ohio

[73] Assignee: Eveready Battery Company, Inc., St. Louis, Mo.

[21] Appl. No.: 508,653

[22] Filed: Apr. 13, 1990

[51] Int. Cl.$^5$ .................. H01M 2/04; H01M 2/06
[52] U.S. Cl. .................... 429/165; 429/175; 429/181
[58] Field of Search ............ 429/165, 164, 166, 27, 429/181, 174, 175, 172

[56] References Cited

U.S. PATENT DOCUMENTS

| | | | |
|---|---|---|---|
| 3,069,489 | 12/1962 | Carmichael et al. | 429/174 |
| 3,318,737 | 5/1967 | Watanabe et al. | 429/181 |
| 3,660,168 | 5/1972 | Ralston et al. | 429/165 |
| 4,869,978 | 9/1989 | Kubo et al. | 429/165 |

*Primary Examiner*—Donald L. Walton
*Attorney, Agent, or Firm*—Robert W. Welsh

[57] ABSTRACT

A cover for a galvanic cell having a reverse curved peripheral edge and a substantially centrally disposed upstanding wall bounding an aperture. A sealing member is positioned below the cover and has a tubular hub which projects through the aperture in the cover and a skirt that electrically insulates the edge of the cover. An electrically conductive fastener is positioned in the tubular hub on the sealing member which tends to cause the edge of the tubular hub to roll or "mushroom" when the electrically conductive fastener is peened or clinched in place. The rolled tubular hub tightly locks the fastener and the cover together while the edge of the cover presses against the inner wall of the container holding the components of the galvanic cell. The pressure tends to slightly bow the cover enabling it to stay in a tightly sealed condition under both physical and thermal stress. A galvanic cell incorporating the cover is also disclosed.

19 Claims, 2 Drawing Sheets

ROLLBACK INNER COVER

BACKGROUND OF THE INVENTION

Seals for batteries are designed to prevent the undesired transfer of moisture either into or out of the cell's interior, as well as the escape of electrolyte which can damage equipment in which the cell is used. Electrolyte can escape from the cell by several routes; two of the most common paths exist at the seal-to-can interface and the seal-to-collector interface. Representative of an attempt to stop the leakage of electrolyte out of a cell, the assignee of the instant application obtained U.S. Pat. No. 3,069,489 on a so-called "radial squeeze seal." In this seal, a gasket material is tightly compressed between a metal cover for the cell and the outer metal container. In addition, sealants and liquid creep inhibitors such as those disclosed in U.S. Pat. No. 3,922,178, which is also assigned to the assignee of the instant invention, are applied to the plastic/metal interface to reduce or eliminate the loss of liquid or moisture from the cell's interior. While the above-mentioned seal compression technique can be used effectively to establish a satisfactory seal, these seals are susceptible to deterioration when exposed to significant fluctuations in temperature, relative humidity or physical stress. Examples of physical stress would include accidental dropping of the cell by the user.

SUMMARY OF THE INVENTION

In accordance with the present invention, a cell's ability to maintain an adequate seal at a plastic-to-metal interface can be greatly improved by designing the seal assembly's inner cover so that it absorbs movements in the seal assembly that are caused by temperature changes and/or physical shocks. The seal assembly consists of several parts and is located over the open end of the container. The function of the assembly is to contain the several internal components that make up the galvanic cell. The inner cover has a substantially flat surface portion extending inwardly from a reversed curved edge portion. The flat portion bounds a depressed or lowered portion which extends inward toward the center of the cover and which, in turn, surrounds an upstanding wall portion which is formed about an aperture in the inner cover. The seal assembly and inner cover have substantially the same outer configuration as the inner configuration of the container.

An improved galvanic cell is also disclosed having a metal container for holding the active components of the galvanic cell and for forming an external electrode for the cell. A seal assembly, including a non-conductive sealing member and an inner cover is provided for the open end of the container. The sealing member has a centrally located upstanding tubular hub portion and an upstanding peripheral skirt portion for contacting the inner wall of the metal container. The inner cover has a reverse curved peripheral edge portion for compressing the upstanding skirt portion of the sealing member between the edge of the cover and the inner wall of the container. A substantially flat portion of the cover extends inwardly from the reverse curved peripheral edge. The substantially flat portion slopes down to a lower surface portion and continues inwardly to an upstanding circular wall which bounds the upstanding tubular hub portion of the sealing member. An electrically conductive metallic member extends through the tubular hub portion in the seal and the upstanding wall portion of the inner cover. A moisture tight seal between the electrically conductive member and the hub of the sealing member is maintained by the ability of the cover's upstanding wall to resist the compressive forces that are created when the rivet is peened. The conductive metal member forms a terminal for the cell and can make electrical contact with a bottom cover which forms the cell's external terminal.

DETAILED DESCRIPTION OF THE PREFERRED EMBODIMENTS

Figure 1:
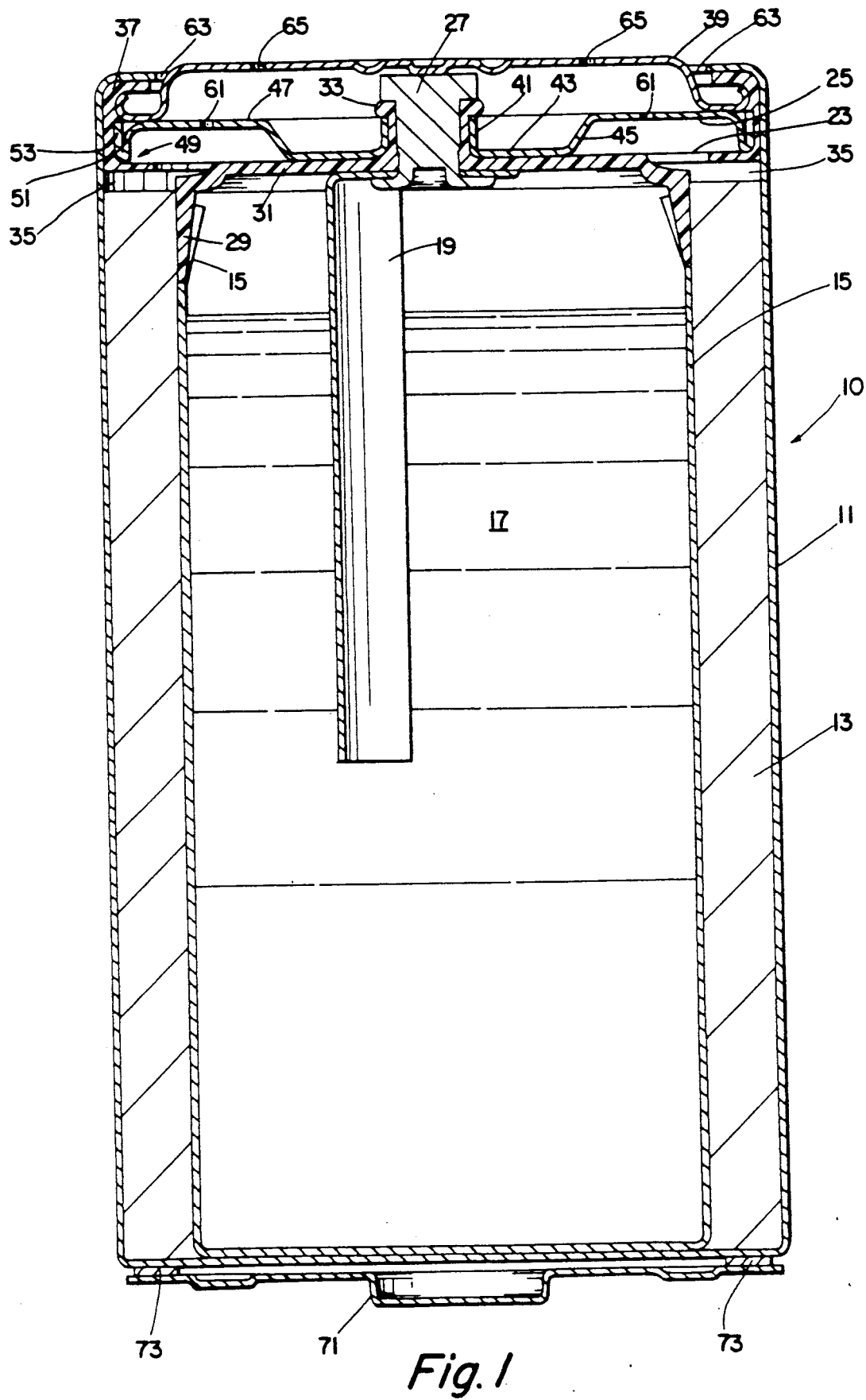
FIG. 1 is a sectional view of a galvanic cell incorporating the improved inner cover.

Referring to FIG. 1, an air assisted alkaline cell is shown and indicated generally by the number 10. The cell is assembled in a conventional conductive steel container 11 which also forms an external terminal for the cell. The cathode for the cell 13 comprises manganese dioxide and is formed about the inner wall of the container 11. After the cathode 13 is in place in the steel container, a separator 15 is added to electrically isolate the anode material 17 from the cathode and the container while still permitting ion transport between the electrodes. The anode material 17 comprises a mixture of zinc powder, a gel forming binder and the liquid electrolyte used in the cell. The electrolyte is preferably a high strength, 35% to 40% by weight, aqueous solution of potassium hydroxide. The open end of the can 11 is closed by a seal assembly comprising a current collector 19, a seal 21, an air permeable membrane 23, an inner cover 25 and a fastener, preferably a rivet 27 which is used to join together the several pieces of the assembly. The rivet is preferably made of brass.

The collector 19 can be made of brass and can be in the form of an elongated pin or nail or preferably in the form of an elongated arcuate member. The seal 21 is made of an organic polymeric material which is compatible with the several components of the cell. The seal 21 is preferably made of polypropylene in view of its compatibility with strong aqueous alkaline solutions. The seal 21 has a depending wedge-like skirt 29, which on assembly contacts the cathode 13 and moves the separator 15 away from the cathode as shown in the FIG. 1. This is done in an attempt to protect the zinc anode material 17 from atmospheric oxygen which could react with the zinc and render a portion of the zinc unavailable for the electrochemical reaction. The seal 21 has a substantially flat bottom portion 31 surrounding an upstanding tubular hub portion 33. The seal has a plurality of spaced air passages 35 through which air can pass to contact the manganese dioxide cathode to recharge the cathode material. A wall portion 37 extends upwardly from the edge of the seal 21. The wall portion 37 would normally be used to insulate the inner cover 25 and the yet to be added bottom cover from the can 11.

A membrane 23 fits within the area of the seal member 21 bounded by the wall 37. The membrane is made of two layers of Teflon. One layer is a non-woven film and the other is a mesh. The two layers are heat sealed together and form an air permeable membrane for the cell. The membrane 23 can be fastened to the bottom portion 31 of the seal 21 by welding. A fatty polyamide adhesive such as the type disclosed in Winger U.S. Pat. No. 3,922,178 can be used to backup the weld and to prevent electrolyte creep between the polypropylene seal and the microporous gasket. Two beads of the adhesive can be used. One bead is placed around the top periphery of the seal bottom 31 where it joins the inside of the wall 37. The second bead can be placed on the top of seal bottom 31 where it joins the outer wall of the tubular hub 33.

The inner cover is commonly referred to as a neutral cover because the part is electrically neutral in most cell constructions. However, in this particular cell construction, it is in physical and electrical contact with the finished cell bottom cover. The inner cover 25 can be made of a polymeric material or metal, preferably stainless steel, and has an inner upstanding wall member 41 in contact with the tubular hub 33 of the seal 21 and is used to compress the seal against the rivet 27. The peripheral edge of the inner cover is preferably of the same configuration as the inner edge of the container i.e., it can be circular, square or rectangular in order to provide a leak-tight seal. The metal cover is preferably prepared using metal stamping techniques. The depressed portion of the inner cover can be prepared by embossing.

Figure 4:
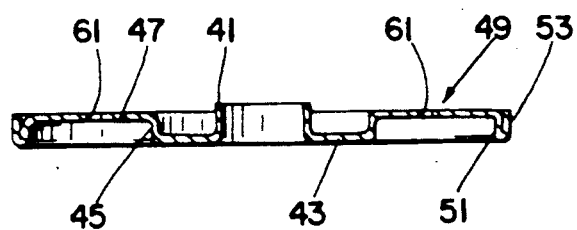
FIG. 4 is a sectional view taken on the line 4—4 of FIG. 3.

Referring again to the inner cover 25, it can be seen that the cover extends outwardly from the upstanding wall portion 41. Extending away from the inner edge 41, the inner cover is in contact with the upper surface of the seal 21 along the portion 43. The portion 43 is bounded by an inclined wall portion 45, which extends upwardly to a substantially flat surface portion 47, which extends outwardly to the edge of the seal member 37 which is in contact with the inner wall of the can 11. The inner cover has a reverse curved portion 49 (FIGS. 1 and 4) made up of a downwardly turned portion 51 which is in contact with an upwardly turned edge 53 to form a reinforced hoop about the peripheral edge of the inner cover.

Figure 3:
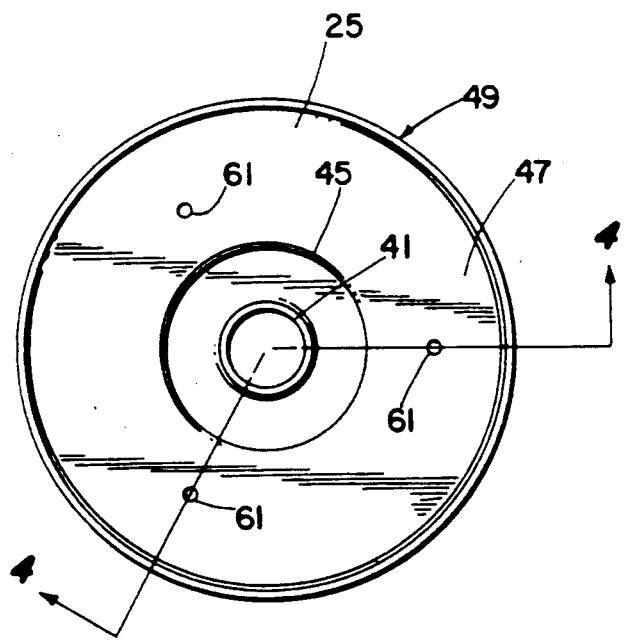
FIG. 3 is a top plan view of the inner cover.

For use in an air assisted alkaline cell, the inner cover 25 should have air passages to allow air to enter the cell. Referring to FIG. 3, it can be seen that the inner cover has three apertures 61 spaced approximately 120° apart. When the inner cover is used in non-air assisted cells it does not need three apertures although one or more can be used as vents for a cell.

To complete assembly of the cell, a bottom cover 39 is placed into the steel container 11 and is also isolated from contact with the container by the wall portion 37 of the seal 21. The bottom cover 39 makes electrical contact with the rivet 27, or other suitable electrically conductive means, enabling the bottom cover 39 to become the second external terminal for the cell. The edge of the steel container 11, and of the edge 37 of the seal 21 are then rolled to hold the bottom cover 39 locked in position on the bottom of the cell. A gap 63 surrounds the bottom cover 39, separating it from contact with the container 11. The bottom cover 39 preferably contains three small apertures 65, two of which are shown in FIG. 1, spaced approximately 120° apart which provide a passage for air to enter into the bottom of the cell. The top cover 71 can be fastened to the container 11 by welds 73 after the cathode is rammed into place. It can be added before or after this step as it is merely attached to the container.

Figure 2:
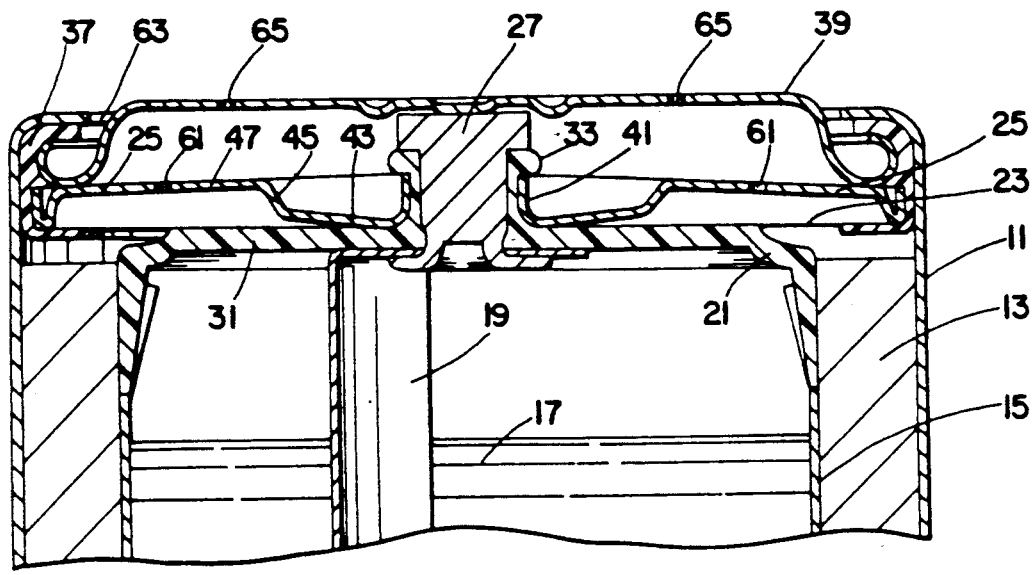
FIG. 2 is a partial sectional view showing the inner cover of FIG. 1 partially bowed.

In the air assisted alkaline cell, air can pass through an aperture 65 in the bottom cover 39 and through an aperture 61 in the inner cover 25 through the air permeable membrane 23 and then through an air passage 35 in the seal 21 to reach the cathode material 13. After the cell is assembled, referring to FIG. 2, the inner cover 25 is preferably bowed in the vicinity of the vertically inclined wall portion 45 and the depressed portion 43 tends to rise from the surface of the center portion 31 of the seal 21. The bowing is a result of the strength of the inner cover and tight fit of the inner cover against the upstanding edge 37 of the seal 21. The inner cover 25 also maintains a constant pressure against the seal about the rivet 27 and the edge of the can 11 to resist leakage of electrolyte material from the cell.

The extended hub portion 33 of seal member 21 tends to roll or "mushroom" over the top edge of the wall 41 of inner cover 25 when the rivet 27 is peened or clinched in the assembly process. The rolled edge of the hub portion 33 tends to hold the seal hub 33 in place relative to the upstanding wall 41, preventing movement between the two pieces. The mushroom shape also prevents the rivet 27 from moving if the cell is dropped. The height of the rivet is maintained and electrical contact is maintained between the rivet and the external electrode 39 even under physical stress. In cells not equipped with the inner cover of the present invention, a drop of the cell onto its bottom cover can drive the rivet into the cell separating the electrical connection between the rivet and the bottom cover.

Through the present invention an improved cover is provided for galvanic cells. The cover not only provides improved leak resistance for the cell, but also provides a measure of both thermal and mechanical shock protection. A galvanic cell produced using the cover of the present invention would also have these improved characteristics.

Though the invention has been described with respect to a specific preferred embodiment thereof, many variations and modifications will become apparent to those skilled in the art. It is therefore the intention that the appended claims be interpreted as broadly as possible in view of the prior art to include all such variations and modifications.

The embodiments of the invention in which an exclusive property or privilege is claimed are defined as follows.

1. A cover for the open end of a container used to retain the several components of a galvanic cell comprising:
   a member of substantially the same outer configuration as the inner configuration of said container and having a substantially flat surface portion extending inwardly from a configured edge portion, said substantially flat surface portion bounding a depressed portion which surrounds an upstanding wall portion about an aperture in said member.

2. The cover of claim 1 wherein said configured edge portion has a first portion of said edge extending downwardly from said substantially flat surface portion contiguous with an adjacent upwardly turned second portion of said edge.

3. The cover of claim 1 wherein said depressed portion of said cover is substantially surrounded by a vertically inclined portion leading up to said substantially flat surface portion.

4. The cover of claim 1 wherein said member has a circular outer configuration.

5. The cover of claim 1 wherein said member has a polygonal configuration.

6. The cover of claim 1 wherein said member has a peripheral edge configured to substantially mate with the walls of the open end in said container to be closed by said member.

7. The cover of claim 1 wherein said member has at least one aperture therein for the passage of air into said galvanic cell.

8. The cover of claim 1 wherein said member is an inner cover for said galvanic cell.

9. The cover of claim 1 wherein said member is made of metal.

10. The cover of claim 1 wherein said member is made of stainless steel.

11. The cover of claim 1 wherein said member is made of polymeric material.

12. An improved galvanic cell comprising:
a container for holding the active components of a galvanic cell and for forming an external electrode for said galvanic cell;
an electrically non-conductive sealing member for one end of said metal container, said sealing member having an upstanding tubular hub portion and an upstanding peripheral skirt portion for contacting the interior of said metal container;
a cover member for sealing said galvanic cell, said cover member having a reverse curved peripheral portion for compressing said upstanding skirt portion of said sealing member against the inner wall of said container and an upstanding annular portion for compressing against said upstanding tubular hub portion on said sealing member; and
a metallic conductive member extending through said tubular hub portion in said seal and said upstanding annular portion of said cover member and being sealed in place by said tubular hub portion of said sealing member and said upstanding annular portion of said cover member, said metallic conductive member forming a second terminal for said galvanic cell.

13. The improved galvanic cell of claim 12 wherein said cover member has at least one aperture therein to allow the passage of air into said galvanic cell.

14. The improved galvanic cell of claim 12 wherein said cover member has a substantially flat surface portion extending inwardly from said edge portion, said substantially flat surface portion bounding a depressed portion which surrounds said upstanding annular portion.

15. The improved galvanic cell of claim 14 wherein said substantially flat surface portion of said cover member has a reverse curved peripheral portion having a downwardly turned portion in surface contact with an adjacent upwardly turned portion which terminates in an edge.

16. The improved galvanic cell of claim 14 wherein said substantially flat surface portion of said cover member has a sloping surface portion leading downwardly to said depressed portion of said member.

17. The improved galvanic cell of claim 16 wherein said cover member tends to bow upwardly near said sloping surface portion when in place in said container.

18. The improved galvanic cell of claim 12 wherein said metallic conductive member is a metal fastener and said upstanding tubular hub portion of said sealing member has its exposed edge portion rolled or "mushroomed" when said fastener is fixed in position.

19. The improved galvanic cell of claim 18 wherein said metallic conductive member is a rivet.

* * * * *